US010950388B2

(12) United States Patent
Sasaki

(10) Patent No.: US 10,950,388 B2
(45) Date of Patent: Mar. 16, 2021

(54) MULTI-LAYER CERAMIC CAPACITOR AND CIRCUIT BOARD

(71) Applicant: Taiyo Yuden Co., Ltd., Tokyo (JP)

(72) Inventor: Takashi Sasaki, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 6 days.

(21) Appl. No.: 16/566,185

(22) Filed: Sep. 10, 2019

(65) Prior Publication Data

US 2020/0090872 A1    Mar. 19, 2020

(30) Foreign Application Priority Data

Sep. 13, 2018    (JP) .............. JP2018-171044

(51) Int. Cl.
| | |
|---|---|
| *H01G 4/30* | (2006.01) |
| *H01G 4/232* | (2006.01) |
| *H01G 4/012* | (2006.01) |
| *H01G 4/008* | (2006.01) |
| *H01G 4/224* | (2006.01) |
| *H01G 4/12* | (2006.01) |

(52) U.S. Cl.
CPC .............. *H01G 4/30* (2013.01); *H01G 4/008* (2013.01); *H01G 4/012* (2013.01); *H01G 4/1209* (2013.01); *H01G 4/224* (2013.01); *H01G 4/232* (2013.01)

(58) Field of Classification Search
None
See application file for complete search history.

(56) References Cited

U.S. PATENT DOCUMENTS

| 10,707,021 B2* | 7/2020 | Park ................. H01G 4/236 |
| 2003/0011962 A1* | 1/2003 | Yamamoto ............ H01G 4/30 361/321.2 |
| 2007/0025053 A1* | 2/2007 | Takahashi ............ H01G 4/30 361/303 |
| 2008/0165469 A1* | 7/2008 | Lee ................. H01G 4/012 361/306.3 |
| 2009/0034154 A1* | 2/2009 | Lee ................. H01G 4/232 361/303 |

(Continued)

FOREIGN PATENT DOCUMENTS

| JP | 2016-127262 A | 7/2016 |
| JP | 2017-28240 A | 2/2017 |

*Primary Examiner* — Dion Ferguson
(74) *Attorney, Agent, or Firm* — Saliwanchik, Lloyd & Eisenschenk

(57) ABSTRACT

A multi-layer ceramic capacitor includes: a ceramic body including first and second end surfaces, first and second side surfaces, first internal electrodes drawn to the first and second end surfaces, second internal electrodes drawn to at least one of the first side surface and the second side surface, and dielectric layers, the first and second internal electrodes being alternately laminated via the dielectric layers; first and second external electrodes that respectively cover the first and second end surfaces, and extend to each of the first and second side surfaces; a third external electrode including a first side-surface region formed on the first side surface and a second side-surface region formed on the second side surface, the first side-surface region and the second side-surface region being formed to be mutually shifted along the first direction and at least partially facing each other in the second direction.

11 Claims, 9 Drawing Sheets

(56) References Cited

U.S. PATENT DOCUMENTS

| | | | |
|---|---|---|---|
| 2009/0279228 A1* | 11/2009 | Lee | H01G 4/232 |
| | | | 361/301.4 |
| 2010/0033897 A1* | 2/2010 | Lee | H01G 4/38 |
| | | | 361/329 |
| 2012/0188684 A1* | 7/2012 | Akazawa | H01G 4/005 |
| | | | 361/321.2 |
| 2014/0029159 A1* | 1/2014 | Shimada | H01G 4/30 |
| | | | 361/303 |
| 2015/0109718 A1* | 4/2015 | Choi | H01G 4/12 |
| | | | 361/304 |
| 2016/0189867 A1* | 6/2016 | Zaima | H01G 4/232 |
| | | | 361/301.4 |
| 2017/0345565 A1* | 11/2017 | Usui | H01G 4/302 |
| 2017/0345566 A1* | 11/2017 | Tanaka | H01G 4/1209 |

* cited by examiner

MULTI-LAYER CERAMIC CAPACITOR AND CIRCUIT BOARD

CROSS-REFERENCE TO RELATED APPLICATION

This application claims priority to Japanese Application No. 2018-171044, filed Sep. 13, 2018, which is hereby incorporated by reference in its entirety.

BACKGROUND

The present disclosure relates to a multi-layer ceramic capacitor and a circuit board on which the multi-layer ceramic capacitor is mounted.

There are known multi-layer ceramic capacitors as disclosed in Japanese Patent Application Laid-open Nos. 2016-127262 and 2017-28240. Those multi-layer ceramic capacitors each include a first external electrode and a second external electrode, which are provided at both end portions in the length direction, and also include a third external electrode formed on a side surface. Such multi-layer ceramic capacitors are each referred to as a three-terminal-type multi-layer ceramic capacitor.

SUMMARY

In recent years, there is a demand for the miniaturization and increase in capacitance of the multi-layer ceramic capacitors. In a case where the miniaturization and the increase in capacitance of the multi-layer ceramic capacitors are increasingly advanced, a calorific value thereof to be obtained after mounting is also likely to be increased. Since the external electrode on the side surface of the three-terminal-type multi-layer ceramic capacitor has a configuration liable to receive radiant heat from a mounting board and difficult to exhaust heat, a configuration with high connection reliability is particularly expected therefor.

In view of the circumstances as described above, it is desirable to provide a multi-layer ceramic capacitor capable of enhancing connection reliability of an external electrode, and a circuit board on which the multi-layer ceramic capacitor is mounted.

According to an embodiment of the present disclosure, there is provided a multi-layer ceramic capacitor including a ceramic body, a first external electrode, a second external electrode, and a third external electrode.

The ceramic body includes a first end surface and a second end surface that face each other in a first direction, a first side surface and a second side surface that face each other in a second direction orthogonal to the first direction, first internal electrodes drawn to the first end surface and the second end surface, second internal electrodes drawn to at least one of the first side surface or the second side surface, and dielectric layers, the first internal electrodes and the second internal electrodes being alternately laminated via the dielectric layers.

The first external electrode covers the first end surface, extends to each of the first side surface and the second side surface, and is connected to the first internal electrodes.

The second external electrode covers the second end surface, extends to each of the first side surface and the second side surface, and is connected to the first internal electrodes.

The third external electrode includes a first side-surface region formed on the first side surface and a second side-surface region formed on the second side surface, and is connected to the second internal electrodes.

The first side-surface region and the second side-surface region are formed to be mutually shifted along the first direction and at least partially face each other in the second direction.

In the configuration described above, when the multi-layer ceramic capacitor is soldered on connection electrodes of a mounting board, a solder located under the center third external electrode, to which heat is most likely to be transmitted first, is melted. The first side-surface region and the second side-surface region are formed to be mutually shifted along the first direction and at least partially face each other in the second direction. Thus, due to the surface tension of the solder, the multi-layer ceramic capacitor is easy to rotate with a lamination direction being as the axis. This makes it easy to remove voids in the solder and makes it possible to enhance connection reliability.

More specifically, it is favorable that a relationship of $0.03 \leq G/D3 \leq 0.50$ is satisfied, where D3 represents a dimension of the third external electrode along the first direction, and G represents a shift amount in the first direction between a center line of the first side-surface region in the first direction and a center line of the second side-surface region in the first direction.

This allows rotational moment, which is derived from the surface tension of the solder at the third external electrode, to be moderately applied to the multi-layer ceramic capacitor. In other words, this can provide the action of removing voids in the solder, and also allows excessive rotation of the multi-layer ceramic capacitor at the time of reflow to be suppressed and allows mounting at a position close to a design mounting position. Therefore, connection reliability can further be improved.

Further, the connection reliability is improved when a relationship of $0.04 \leq G/D3 \leq 0.40$ is satisfied. It is more favorable that a relationship of $0.06 \leq G/D3 \leq 0.40$ is satisfied.

Additionally, it is favorable that a relationship of $5.0 \leq (G*D3)/(D1+D2) \leq 400$ is satisfied, where D1 represents a dimension of the first external electrode in the first direction, D2 represents a dimension of the second external electrode in the first direction, D3 represents a dimension of the third external electrode along the first direction, and G represents a shift amount in the first direction between a center line of the first side-surface region in the first direction and a center line of the second side-surface region in the first direction.

In the configuration described above, in a case where the multi-layer ceramic capacitor is rotated due to the surface tension of the solder at the third external electrode, the solders located under the first external electrode and the second external electrode are subsequently melted, and rotational moment based on the surface tensions of the solders is applied to the first external electrode and the second external electrode. Accordingly, the rotational moment in the direction opposite to the rotational moment derived from the surface tension of the solder at the third external electrode is applied. In other words, even if the multi-layer ceramic capacitor is rotated from the design mounting position, a force restoring the multi-layer ceramic capacitor to such a mounting position acts later, and the multi-layer ceramic capacitor is to be mounted to a position close to such a mounting position. Therefore, the connection reliability can further be improved.

Further, the connection reliability is improved when a relationship of $10.0 \leq (G*D3)/(D1+D2) \leq 250$ is satisfied. It is more favorable that a relationship of $20.0 \leq (G*D3)/(D1+D2) \leq 100$ is satisfied.

Further, when the ceramic body has a dimension of 0.2 mm or more and 1.0 mm or less in the second direction, the weight of the multi-layer ceramic capacitor can be set to a favorable range, and a moderate rotation can be applied.

Additionally, it is favorable that the multi-layer ceramic capacitor has an electrostatic capacitance of 23 µF or more and less than 30 µF, and it is more favorable that the multi-layer ceramic capacitor has an electrostatic capacitance of 30 µF or more and 47 µF or less.

This allows the capacitance of the multi-layer ceramic capacitor to be increased.

According to another embodiment of the present disclosure, there is provided a circuit board including: a multi-layer ceramic capacitor including a ceramic body, and a first external electrode, a second external electrode, and a third external electrode that are formed on the ceramic body; and a mounting board including a first connection electrode connected to the first external electrode via a first solder, a second connection electrode connected to the second external electrode via a second solder, and a third connection electrode connected to the third external electrode via a third solder.

The ceramic body includes a first end surface and a second end surface that face each other in a first direction, a first side surface and a second side surface that face each other in a second direction orthogonal to the first direction, first internal electrodes drawn to the first end surface and the second end surface, second internal electrodes drawn to at least one of the first side surface or the second side surface, and dielectric layers, the first internal electrodes and the second internal electrodes being alternately laminated via the dielectric layers.

The first external electrode covers the first end surface, extends to each of the first side surface and the second side surface, and is connected to the first internal electrodes.

The second external electrode covers the second end surface, extends to each of the first side surface and the second side surface, and is connected to the first internal electrodes.

The third external electrode includes a first side-surface region formed on the first side surface and a second side-surface region formed on the second side surface, and is connected to the second internal electrodes.

The first side-surface region and the second side-surface region are formed to be mutually shifted along the first direction and at least partially face each other in the second direction.

As described above, according to the present disclosure, it is possible to provide a multi-layer ceramic capacitor capable of enhancing connection reliability of an external electrode, and a circuit board on which the multi-layer ceramic capacitor is mounted.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, embodiments of the present disclosure will be described with reference to the drawings.

In the figures, an X axis, a Y axis, and a Z axis orthogonal to one another are shown as appropriate. The X axis, the Y axis, and the Z axis are common in all figures.

1. Configuration of Multi-Layer Ceramic Capacitor 10

Figure 1:
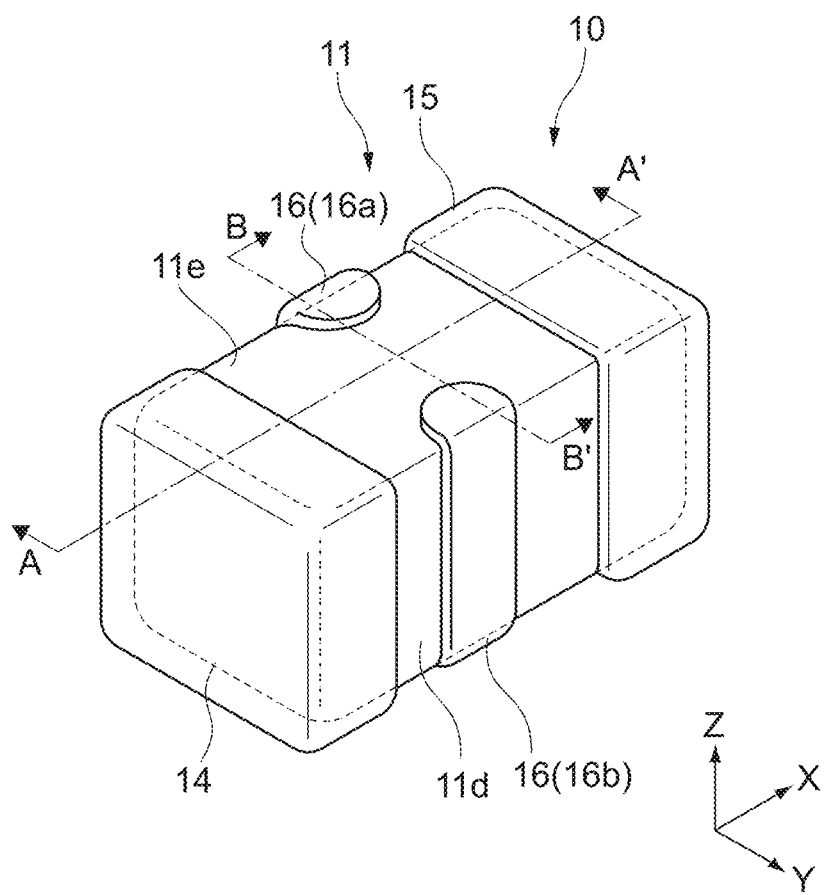
FIG. 1 is a perspective view of a multi-layer ceramic capacitor according to an embodiment of the present disclosure.
Figure 2:
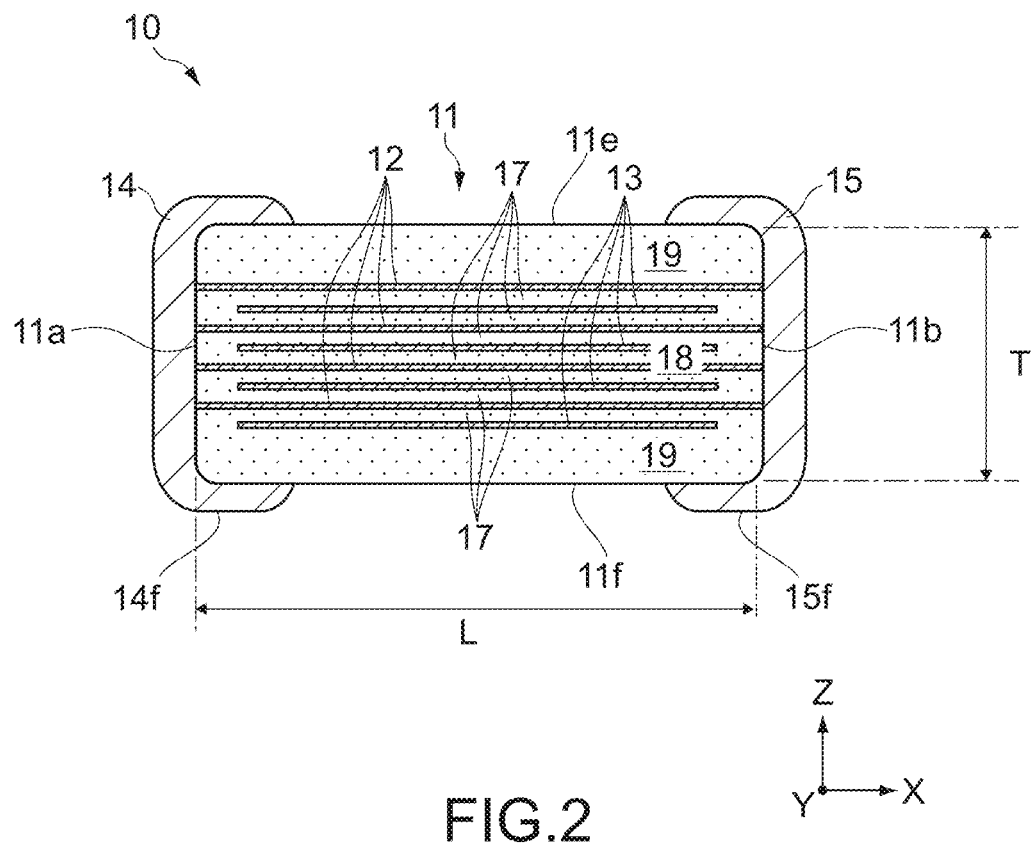
FIG. 2 is a cross-sectional view of the multi-layer ceramic capacitor taken along the A-A' line in FIG. 1.
Figure 3:
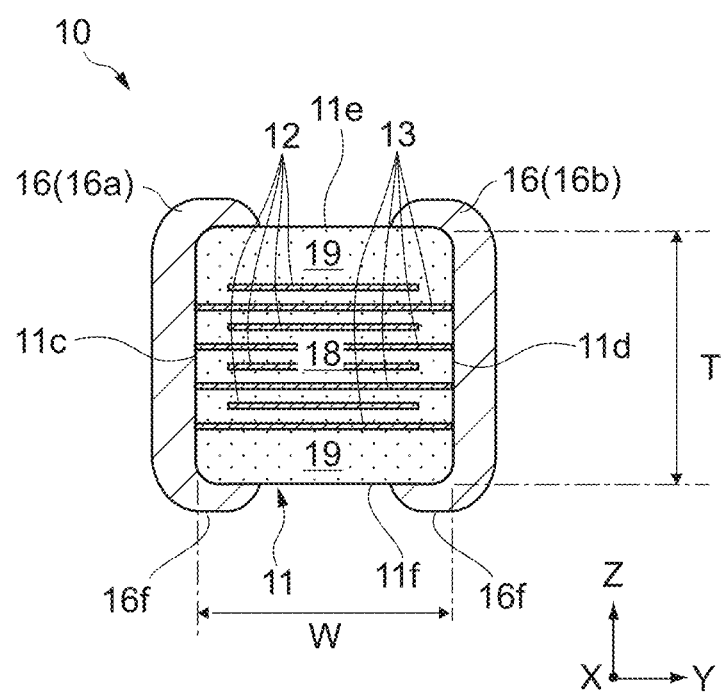
FIG. 3 is a cross-sectional view of the multi-layer ceramic capacitor taken along the B-B' line in FIG. 1.

FIGS. 1 to 3 each show a multi-layer ceramic capacitor 10 according to a first embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 is a three-terminal-type multi-layer ceramic capacitor including a ceramic body 11, a first external electrode 14, a second external electrode 15, and a third external electrode 16.

In the multi-layer ceramic capacitor 10, for example, the first and second external electrodes 14 and 15 are configured as through electrodes, and the third external electrode 16 is configured as a ground electrode. The first external electrode 14 and the second external electrode 15 are also referred to as end-surface external electrodes 14 and 15, respectively, and the third external electrode 16 is also referred to as a side-surface external electrode 16.

The ceramic body 11 is configured as a rectangular parallelepiped shape as a whole. The ceramic body 11 has two end surfaces 11a and 11b facing in an X-axis direction, two side surfaces 11c and 11d facing in a Y-axis direction, and two main surfaces 11e and 11f facing in a Z-axis direction. Ridges connecting the respective surfaces of the ceramic body 11 are chamfered, but the shape of the ceramic body 11 is not limited to the above shape. It should be noted that FIG. 1 shows the configuration of the ceramic body 11, which is covered with the first, second, and third external electrodes 14, 15, and 16, by using broken lines.

The ceramic body 11 has a length dimension L in the X-axis direction, a width dimension W in the Y-axis direction, and a height dimension T in the Z-axis direction. The length dimension L, the width dimension W, and the height dimension T are the largest dimensions among the dimensions of the ceramic body 11 along the X-axis direction, the Y-axis direction, and the Z-axis direction, respectively.

The width dimension W of the ceramic body 11 can be set to 0.2 mm or more and 1.6 mm or less. This makes it possible to reduce the size of the multi-layer ceramic capacitor 10 and to facilitate rotation of the multi-layer ceramic capacitor 10 at the time of soldering as will be described later.

Further, the length dimension L of the ceramic body 11 in the X-axis direction can be set to, for example, 0.4 mm or more and 3.2 mm or less, and the height dimension T of the ceramic body 11 in the Z-axis direction can be set to, for example, 0.2 mm or more and 1.6 mm or less.

The end-surface external electrodes 14 and 15 are formed to face each other in the X-axis direction and to respectively cover the end surfaces 11a and 11b. The end-surface external electrodes 14 and 15 are each connected to first internal electrodes 12 to be described later and have the same polarity. In this embodiment, the end-surface external electrodes 14 and 15 also extend from the end surfaces 11a and 11b to the main surfaces 11e and 11f and the side surfaces 11c and 11d. Regions of the end-surface external electrodes 14 and 15 on the main surface 1 if side are regions that can be connected to an external circuit board as will be described later and are referred to as connection regions 14f and 15f, respectively.

The side-surface external electrode 16 includes a first side-surface region 16a formed on the side surface 11c of the ceramic body 11 and a second side-surface region 16b formed on the other side surface 11d of the ceramic body 11. Each of the first side-surface region 16a and the second side-surface region 16b is formed in a belt-like shape extending in the Z-axis direction from one main surface 11e to the other main surface 11f. In this embodiment, the first side-surface region 16a and the second side-surface region 16b are separated from each other on the main surfaces 11e and 11f and configured as different electrodes. A region of the side-surface external electrode 16 on the main surface 11f side is a region that can be connected to an external circuit board as will be described later and is referred to as a connection region 16f.

Each of the first side-surface region 16a and the second side-surface region 16b is connected to second internal electrodes 13 to be described later and have the same polarity, which is different from the polarity of the end-surface external electrodes 14 and 15.

Further, the first side-surface region 16a and the second side-surface region 16b are mutually shifted in the X-axis direction, which will be described later in detail.

The first, second, and third external electrodes 14, 15, and 16 are each formed of a good conductor of electricity. Examples of the good conductor of electricity forming the first, second, and third external electrodes 14, 15, and 16 include a metal mainly containing copper (Cu), nickel (Ni), tin (Sn), palladium (Pd), platinum (Pt), silver (Ag), gold (Au), or the like, and an alloy of those metals.

Figure 4:
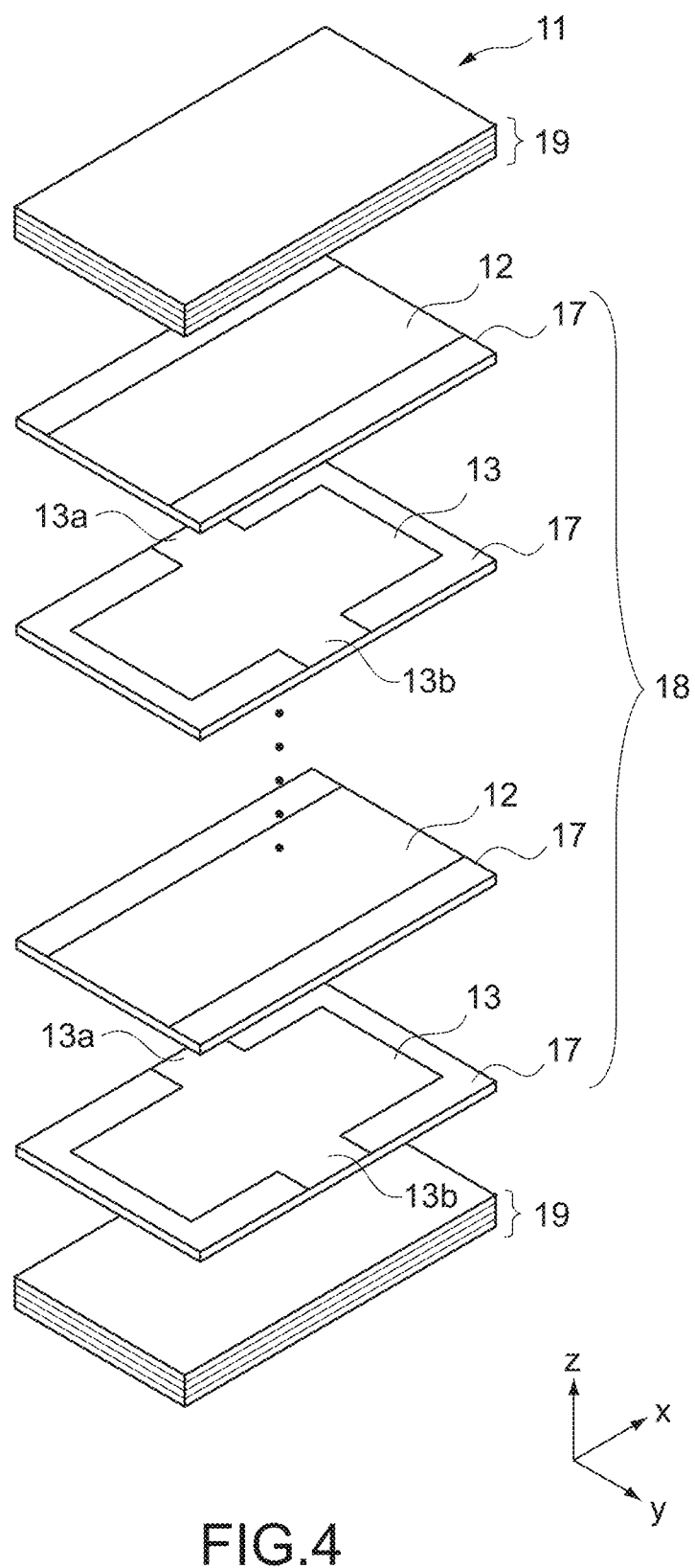
FIG. 4 is an exploded perspective view of a ceramic body of the multi-layer ceramic capacitor.

FIG. 4 is an exploded perspective view of the ceramic body 11. Although the ceramic body 11 is not exploded actually, FIG. 4 shows the ceramic body 11 in the exploded manner for the purpose of description.

The ceramic body 11 includes a multi-layer unit 18 and covers 19. The multi-layer unit 18 has a configuration in which the first internal electrodes 12 and the second internal electrodes 13 are alternately laminated in the Z-axis direction via ceramic layers 17. The covers 19 cover an upper surface and a lower surface of the multi-layer unit 18 in the Z-axis direction.

The first internal electrodes 12 and the second internal electrodes 13 are each a good conductor of electricity and each formed of a metal conductor. Examples of the material forming the first and second internal electrodes 12 and 13 include a metal and alloy mainly containing nickel (Ni).

The first internal electrodes 12 are each formed in a belt-like shape extending over the entire length of the ceramic body 11 in the X-axis direction. The first internal electrodes 12 are drawn to the end surfaces 11a and 11b to be connected to the end-surface external electrodes 14 and 15.

The second internal electrodes 13 are each formed at the center portion of the ceramic body 11 on the X-Y plane. Each of the second internal electrodes 13 includes drawn portions 13a and 13b that are drawn to the side surfaces 11c and 11d to be connected to the side-surface external electrode 16. The drawn portions 13a and 13b may be mutually shifted in the X-axis direction or not. It should be noted that the width dimension of the first internal electrode 12 in the Y-axis direction and the width dimension of the second internal electrode 13 in the Y-axis direction, which excludes the drawn portions 13a and 13b, are formed to be substantially the same.

In the multi-layer ceramic capacitor 10, when a voltage is applied between the end-surface external electrodes 14 and 15 and the side-surface external electrode 16, the voltage is applied to the plurality of ceramic layers 17 provided between the first internal electrodes 12 and the second internal electrodes 13. Accordingly, the multi-layer ceramic capacitor 10 stores charge corresponding to the voltage applied between the end-surface external electrodes 14 and 15 and the side-surface external electrode 16.

The multi-layer ceramic capacitor 10 may have an electrostatic capacitance of, for example, 23 μF or more and less than 30 μF, and may further have an electrostatic capacitance of 30 μF or more and 47 μF or less. Such a product having a relatively high capacitance has a large calorific value when the product is supplied with power to operate, whereas such a product can be satisfactorily mounted by soldering. Thus, waste heat can be efficiently discharged. The electrostatic capacitance of the multi-layer ceramic capacitor 10 can be adjusted on the basis of the material of the ceramic layers 17, the number of layers of the first and second internal electrodes 12 and 13, a thickness dimension of the ceramic layer 17 in the Z-axis direction, and the like.

Examples of the material of the ceramic layers 17 that can achieve a high dielectric constant include a material having a Perovskite structure containing barium (Ba) and titanium (Ti), which is typified by barium titanate ($BaTiO_3$). Alternatively, the ceramic layers 17 may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

It should be noted that the covers 19 are also made of dielectric ceramics. The material of the covers 19 only needs to be insulating ceramics, but use of the dielectric ceramics similar to the dielectric ceramics of the ceramic layers 17 leads to suppression of internal stress in the ceramic body 11.

The number of layers of the first and second internal electrodes 12 and 13 can be set to, for example, approximately several tens to several hundreds of layers.

Further, the thickness dimension of the ceramic layer 17 provided between the first and second internal electrodes 12 and 13 along the Z-axis direction can be set in consideration of a desired electrostatic capacitance, the number of layers of the first and second internal electrodes 12 and 13, the material of the ceramic layers 17, the size of the ceramic body 11, and the like. For example, the thickness dimension of the ceramic layer 17 along the Z-axis direction can be set to approximately 0.3 µm to 2.0 µm.

2. Method of Producing Multi-Layer Ceramic Capacitor 10

Figure 5:
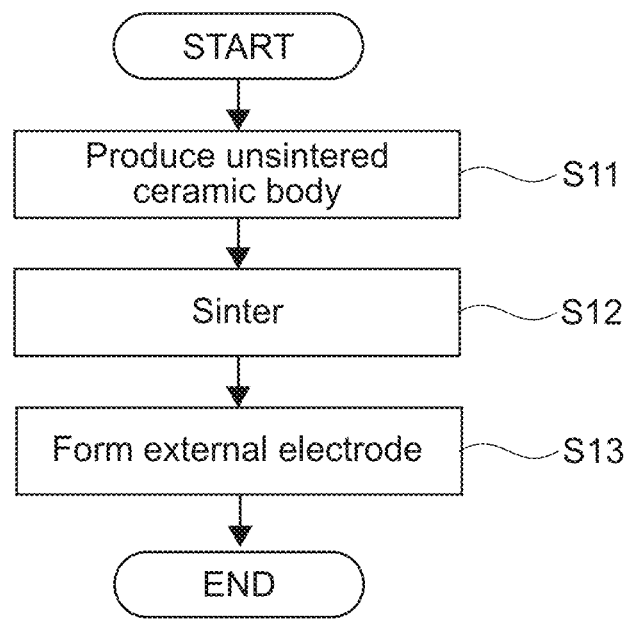
FIG. 5 is a flowchart showing a method of producing the multi-layer ceramic capacitor.
Figure 6:
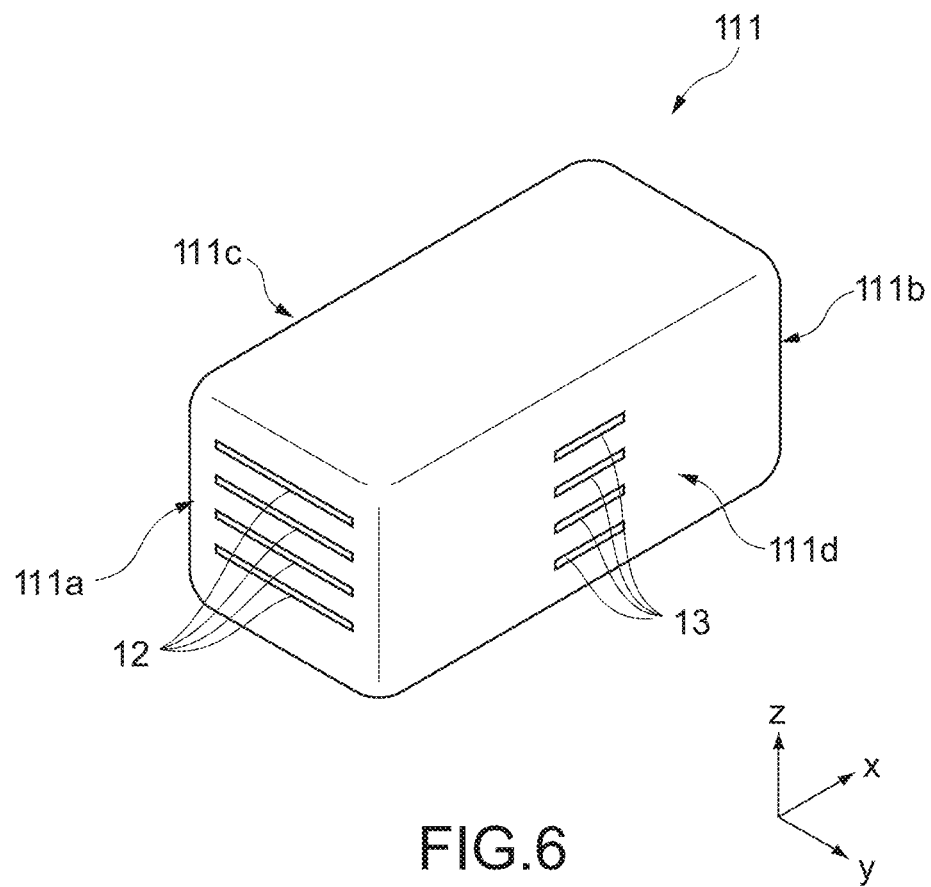
FIG. 6 is a perspective view showing a production process of the multi-layer ceramic capacitor.

FIG. 5 is a flowchart showing a method of producing the multi-layer ceramic capacitor 10. FIG. 6 is a view schematically showing a production process of the multi-layer ceramic capacitor 10. Hereinafter, the method of producing the multi-layer ceramic capacitor 10 will be described with reference to FIGS. 5 and 6 as appropriate.

(Step S11: Production of Unsintered Ceramic Body 111)

In Step S11, unsintered first and second internal electrodes 12 and 13 are formed on ceramic green sheets corresponding to the ceramic layers 17 and are laminated as shown in FIG. 4, to thus produce an unsintered ceramic body 111 shown in FIG. 6.

The ceramic green sheets are configured as unsintered dielectric green sheets mainly containing dielectric ceramics. The laminate of the ceramic green sheets including the unsintered first and second internal electrodes 12 and 13 formed thereon corresponds to an unsintered multi-layer unit 18. Ceramic green sheets on which internal electrodes are not formed are laminated on an upper surface and a lower surface of the unsintered multi-layer unit 18 in the Z-axis direction, and unsintered covers 19 are thus formed.

The laminated ceramic green sheets are integrated by pressure-bonding. Accordingly, the unsintered ceramic body 111 shown in FIG. 6 is produced. For the pressure-bonding, for example, hydrostatic pressing or uniaxial pressing is used.

As shown in FIG. 6, in the ceramic body 111, the first internal electrodes 12 are exposed on end surfaces 111$a$ and 111$b$, and the second internal electrodes 13 are exposed on side surfaces 111$c$ and 111$d$.

It should be noted that while the unsintered ceramic body 111 corresponding to the single ceramic body 11 has been described above, in actually, a multi-layer sheet configured as a large-sized sheet, which is not singulated, is formed and then singulated into the ceramic bodies 111.

(Step S12: Sintering)

In Step S12, the unsintered ceramic body 111 obtained in Step S11 is sintered, to produce the ceramic body 11 shown in FIGS. 1 to 4. Sintering can be performed in a reduction atmosphere or a low-oxygen partial pressure atmosphere, for example. It should be noted that after the unsintered ceramic body 111 is sintered, the unsintered ceramic body 111 may be chamfered by barrel polishing or the like.

(Step S13: Formation of First, Second, and Third External Electrodes 14, 15, and 16)

In Step S13, the first, second, and third external electrodes 14, 15, and 16 are formed on the ceramic body 11. The first, second, and third external electrodes 14, 15, and 16 are formed by applying an electrically conductive paste to the ceramic body 11 and baking the electrically conductive paste thereon. The application of the electrically conductive paste to the ceramic body 11 can be performed by an optional method such as dipping and printing.

It should be noted that the electrically conductive paste for forming the first, second, and third external electrodes 14, 15, and 16 may be applied to the unsintered ceramic body 111, and the unsintered ceramic body 111 and the electrically conductive paste may be sintered at the same time.

Hereinafter, the configurations of the first, second, and third external electrodes 14, 15, and 16 will be described in detail.

3. Detailed Configurations of First, Second, and Third External Electrodes 14, 15, and 16

Figure 7:
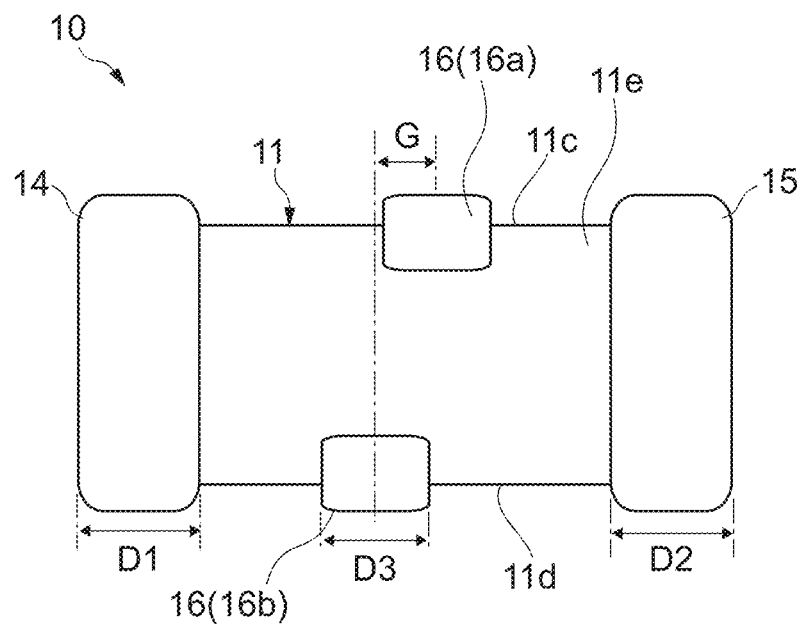
FIG. 7 is a top view of the multi-layer ceramic capacitor.
Figure 8:
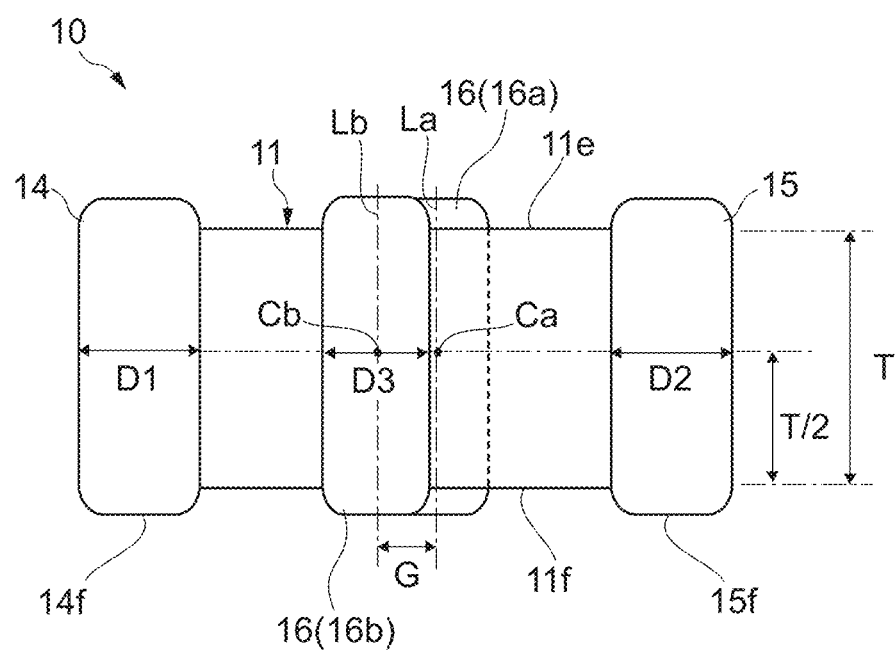
FIG. 8 is a side view of the multi-layer ceramic capacitor.

FIG. 7 is a top view of the multi-layer ceramic capacitor 10, and FIG. 8 is a side view of the multi-layer ceramic capacitor 10.

The first side-surface region 16$a$ and the second side-surface region 16$b$ of the side-surface external electrode 16 are formed so as to be mutually shifted in the X-axis direction and at least partially face each other in the Y-axis direction. In other words, the first side-surface region 16$a$ and the second side-surface region 16$b$ are not completely displaced and are formed so as to partially overlap each other in the X-axis direction. Accordingly, as will be described later, connection reliability obtained when the multi-layer ceramic capacitor 10 is mounted on a circuit board can be enhanced.

More specifically, the multi-layer ceramic capacitor 10 of this embodiment is configured such that a shift amount G and a side-surface electrode width D3 of the side-surface external electrode 16 satisfy a relationship of $0.03 \leq G/D3 \leq 0.50$, favorably $0.04 \leq G/D3 \leq 0.40$, more favorably $0.06 \leq G/D3 \leq 0.40$.

The shift amount G is assumed as a distance in the X-axis direction between the center line La of the first side-surface region 16$a$ in the X-axis direction and the center line Lb of the second side-surface region 16$b$ in the X-axis direction.

The center line La is a line extending in the Z-axis direction so as to divide the first side-surface region 16$a$ into two in the X-axis direction and is also a line passing through the center point Ca in the X-axis direction at half of the height dimension T of the ceramic body 11. Similarly, the center line Lb is a line extending in the Z-axis direction so as to divide the second side-surface region 16$b$ into two in the X-axis direction and is also a line passing through the center point Cb in the X-axis direction at half of the height dimension T of the ceramic body 11.

The side-surface electrode width D3 is a dimension of the side-surface external electrode 16 along the X-axis direction and is a mean value of the dimensions of the first side-surface region 16$a$ and the second side-surface region 16$b$ along the X-axis direction at half of the height dimension T of the ceramic body 11.

Additionally, from the viewpoint of enhancing the connection reliability after the multi-layer ceramic capacitor 10 is mounted on a board, the shift amount G, the side-surface electrode width D3, and end-surface electrode widths D1 and D2 of the end-surface external electrodes 14 and 15 favorably satisfy the following relationship. In other words, the dimension of the first external electrode 14 in the X-axis direction is represented as an end-surface electrode width D1, and the dimension of the second external electrode 15 in the X-axis direction is represented as an end-surface electrode width D2. In this case, it is favorable that G, D1, D2, and D3 satisfy the relationship of, for example, $5.0 \leq (G*D3)/(D1+D2) \leq 400$, favorably $10.0 \leq (G*D3)/(D1+D2) \leq 250$, more favorably $20.0 \leq (G*D3)/(D1+D2) \leq 100$.

The end-surface electrode widths D1 and D2 are dimensions of the end-surface external electrodes 14 and 15 along the X-axis direction at half of the height dimension T of the ceramic body 11, and are mean values of dimensions of the respective regions facing in the Y-axis direction.

The first, second, and third external electrodes 14, 15, and 16 are soldered by, for example, a reflow method, and thus the multi-layer ceramic capacitor 10 is mounted on a circuit board 100.

Figure 9:
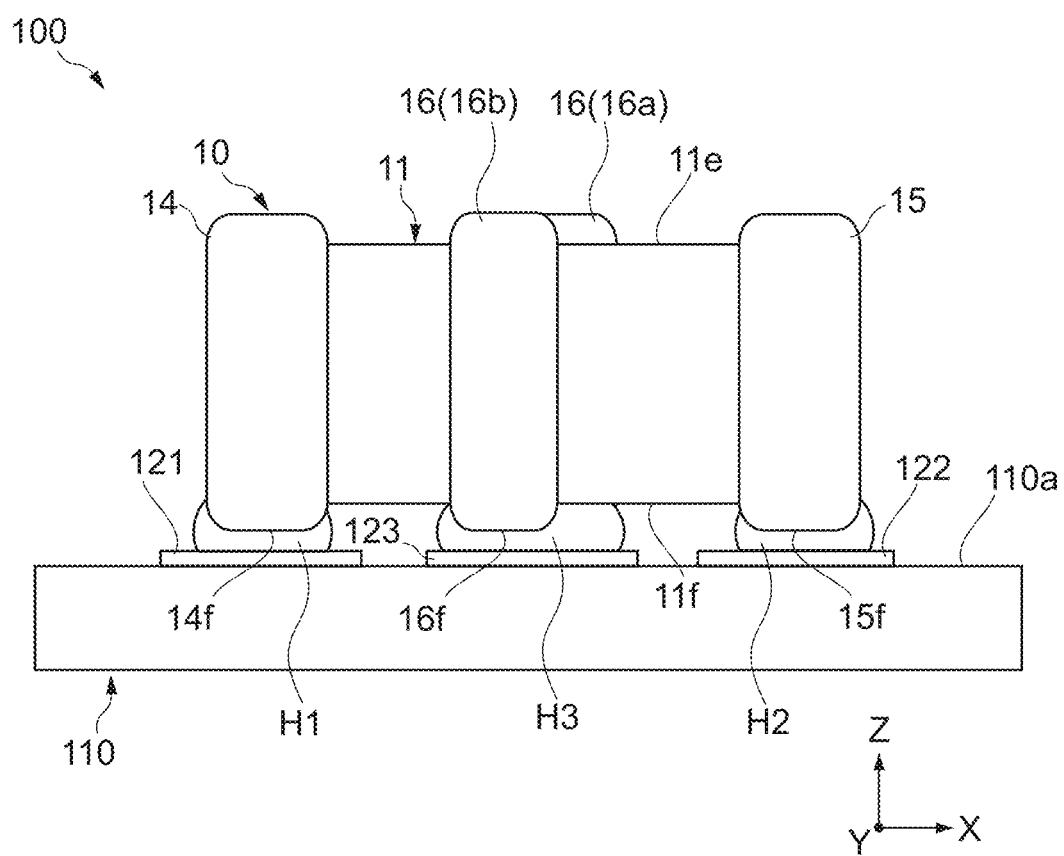
FIG. 9 is a side view of a circuit board on which the multi-layer ceramic capacitor is mounted.
Figure 10:
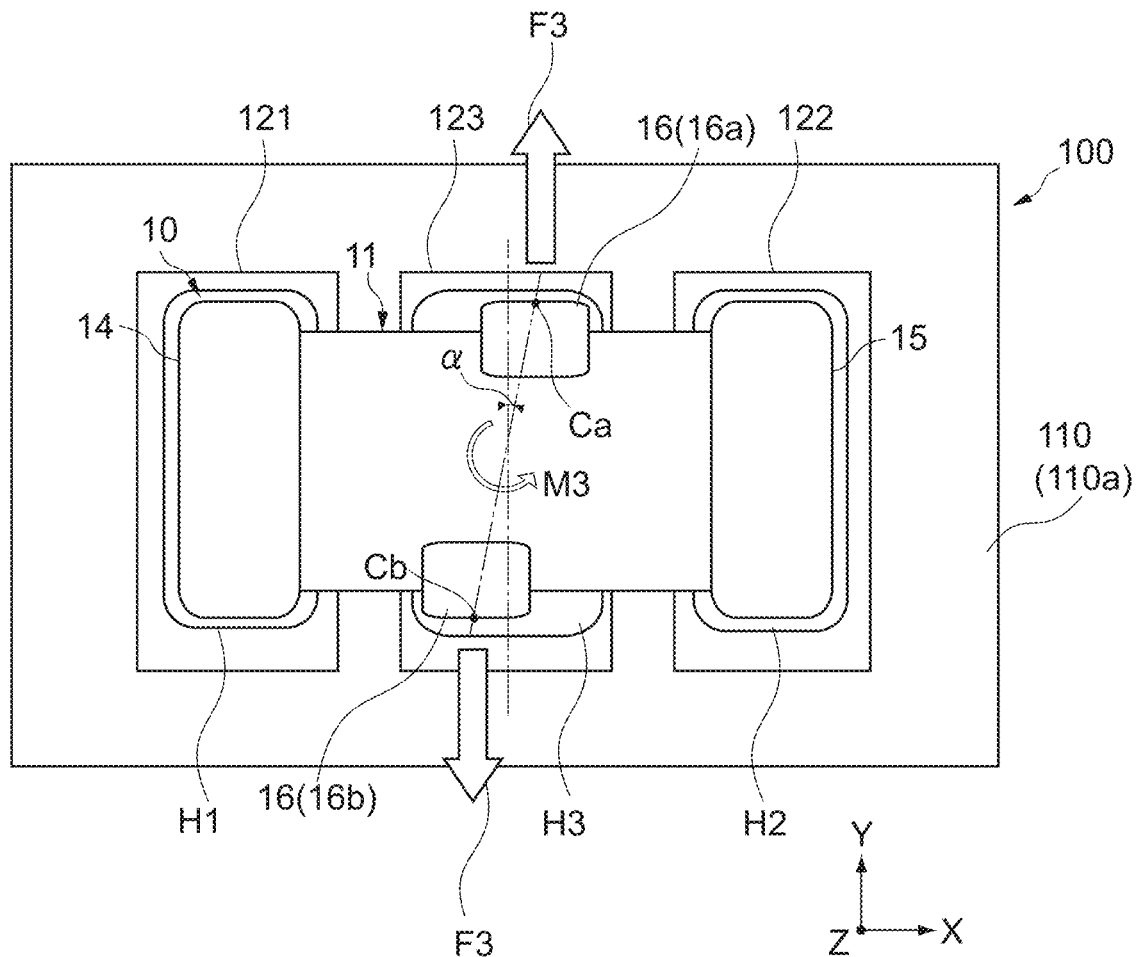
FIG. 10 is a top view of the circuit board on which the multi-layer ceramic capacitor is mounted.
Figure 11:
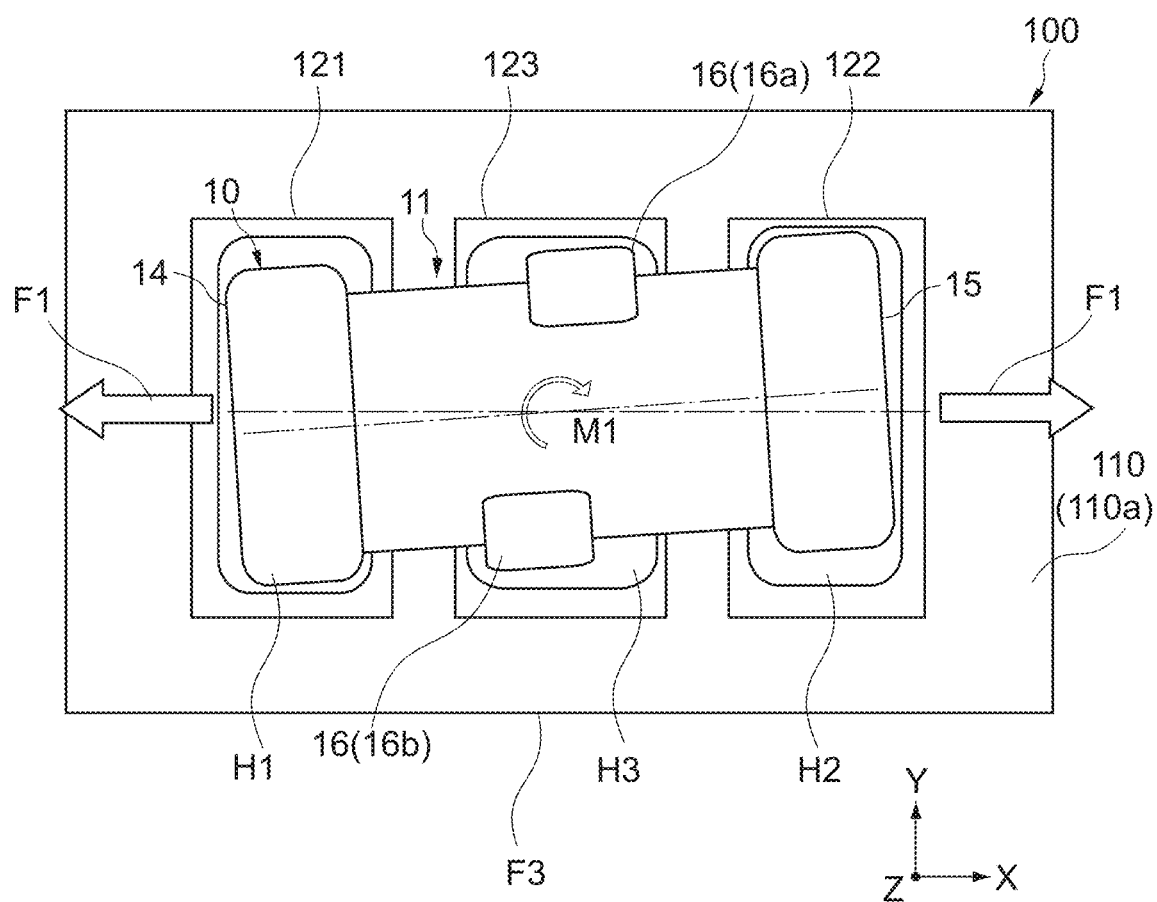
FIG. 11 is a top view of the circuit board on which the multi-layer ceramic capacitor is mounted.

4. Configuration of Circuit Board 100 on which Multi-Layer Ceramic Capacitor 10 is Mounted FIGS. 9 to 11 are views of the circuit board 100 on which the multi-layer ceramic capacitor 10 is mounted. FIG. 9 is a side view, and FIGS. 10 and 11 are top views.

The circuit board 100 includes the multi-layer ceramic capacitor 10 and a mounting board 110.

The mounting board 110 includes a first connection electrode (land) 121 connected to the first external electrode 14 via a first solder H1, a second connection electrode (land) 122 connected to the second external electrode 15 via a second solder H2, and a third connection electrode (land) 123 connected to the third external electrode 16 via a third solder H3.

The multi-layer ceramic capacitor 10 is disposed on the lands 121, 122, and 123 such that the main surface 11f and the mounting board 110 face each other in the Z-axis direction.

The lands 121 and 122 function as through electrode terminals, and the land 123 functions as a ground electrode terminal.

The lands 121, 122, and 123 have substantially rectangular shapes larger than the connection regions 14f, 15f, and 16f of the first, second, and third external electrodes 14, 15, and 16, respectively. Each of the lands 121, 122, and 123 is designed to take a position and a shape in which sides of the outer edge of the land are parallel to the X- and Y-axis directions of the multi-layer ceramic capacitor 10. For example, the land 123 is configured to cover the connection regions 16f of both the first side-surface region 16a and the second side-surface region 16b and to have a substantially rectangular shape in which the dimension of the land 123 along the Y-axis direction is larger than the width dimension W of the ceramic body 11. The designed position for mounting the connection regions 14f, 15f, and 16f on the lands 121, 122, and 123 is referred to as a "design position".

The first, second, and third solders H1, H2, and H3 are heated and melted, and then cooled and solidified, thus respectively connecting the first, second, and third external electrodes 14, 15, and 16 and the lands 121, 122, and 123 to each other. The first, second, and third solders H1, H2, and H3 are formed so as to respectively cover the entire surfaces of the respective connection regions 14f, 15f, and 16f.

During reflow, the third solder H3 that is likely to receive radiant heat and conductive heat from the mounting board 110 is melted earlier than the first and second solders H1 and H2. In this case, due to the surface tension of the melted third solder H3, a force along the Y-axis direction is applied to the side-surface external electrode 16. As shown in FIG. 10, the surface tension can be represented as a force F3 in the Y-axis direction, which is applied to the center point Ca and the center point Cb, for example.

The first side-surface region 16a and the second side-surface region 16b, which are the points of action of the force F3, are formed to be mutually shifted. Thus, a straight line connecting the center point Ca of the first side-surface region 16a and the center point Cb of the second side-surface region 16b to each other and a straight line along the Y-axis direction parallel to the force F3 form a rotation angle α. In other words, rotational moment M3 about the Z axis, which is expressed by the following expression (1), is applied to the side-surface external electrode 16 by the force F3.

$$M3 = (W/2 \cos \alpha)*(\sin \alpha \cdot F3) = (W*F3*\tan \alpha)/2$$

$$M3 = (F3*G)/2 \qquad (1)$$

From the expression (1) described above, as the shift amount G becomes larger, the rotational moment M3 becomes larger. Meanwhile, in actuality, as the side-surface electrode width D3 becomes larger, the amount of the third solder H3 becomes larger, which hinders the rotation operation of the multi-layer ceramic capacitor 10. Thus, the shift amount G with respect to the side-surface electrode width D3 of the side-surface external electrode 16 is defined so as to satisfy the relationship of $0.03 \leq G/D3 \leq 0.50$, favorably $0.04 \leq G/D3 \leq 0.40$, more favorably $0.06 \leq G/D3 \leq 0.40$. This makes it possible to moderately prompt the multi-layer ceramic capacitor 10 to be rotated with respect to the mounting board 110.

When the multi-layer ceramic capacitor 10 is rotated, the melted third solder H3 flows and comes into contact with external air such as atmospheric air, and thus voids in the third solder H3 are removed. This makes it possible to enhance the connection strength of the side-surface external electrode 16 and the land 123, enhance the connection reliability, and also enhance radiation performance of the third solder H3.

After the third solder H3 is melted, the first and second solders H1 and H2 start to be melted a little later, for example. In this case, as shown in FIG. 11, due to the surface tensions of the first and second solders H1 and H2, a force F1 along the X-axis direction is applied to the end-surface external electrodes 14 and 15. In the case where the multi-layer ceramic capacitor 10 is rotated from the design position by the rotational moment M3 or the like, rotational moment M1 in the opposite direction, which cancels out such rotation, can be applied by the force F1. In other words, due to the surface tensions of the first, second, and third solders H1, H2, and H3, the multi-layer ceramic capacitor 10 is automatically adjusted to be disposed at the design position.

Such a so-called self-alignment action is exerted on the basis of the balance between the rotational moment M3 related to the side-surface external electrode 16 described above and the rotational moment M1 derived from the force F1 related to the end-surface external electrodes 14 and 15.

Since the force F1 has a correlation with connection areas in which the connection regions 14f and 15f of the end-surface external electrodes 14 and 15 are connected to the lands 121 and 122, the force F1 also has a correlation also with (D1+D2) corresponding to the length dimensions of the connection regions 14f and 15f in the X-axis direction.

Meanwhile, with reference to the expression (1), the rotational moment M3 is expressed by a product of the shift amount G and the force F3. Since the force F3 has a correlation with a connection area in which the connection region 16f is connected to the land 123, the force F3 also has a correlation with D3 corresponding to the length dimension of the connection region 16f in the X-axis direction. Accordingly, it is favorable that the balance between (D1+D2) and (G*D3) satisfies the relationship of, for example, $5.0 \leq (G*D3)/(D1+D2) \leq 400$, favorably $10.0 \leq (G*D3)/(D1+D2) \leq 250$, more favorably $20.0 \leq (G*D3)/(D1+D2) \leq 100$. When an adjustment to satisfy such a relationship is performed, the self-alignment action described above can be exerted in addition to the action of removing voids.

Connecting the multi-layer ceramic capacitor 10 to the lands 121, 122, and 123 at the design position allows the connection between the multi-layer ceramic capacitor 10 and the mounting board 110 to be made more reliable and allows the connection reliability to be enhanced. Additionally, this makes it possible to minimize a mount space for the multi-layer ceramic capacitor 10 on the mounting board 110 and to contribute to downsizing of an electronic component on which the circuit board 100 is to be mounted.

5. Other Embodiments

Figure 12:
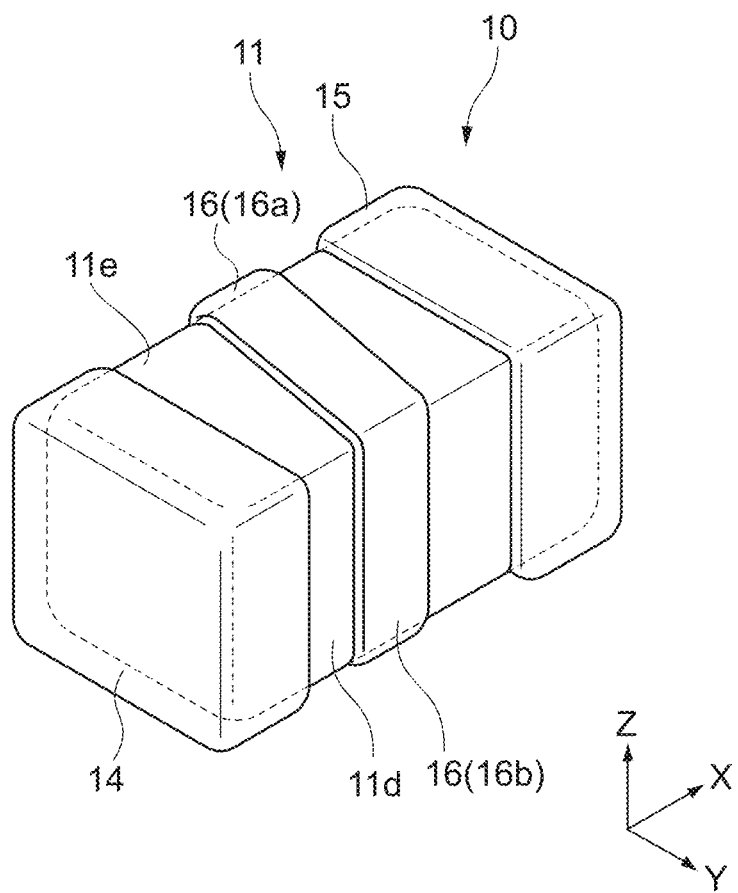
FIG. 12 is a perspective view of a multi-layer ceramic capacitor according to another embodiment of the present disclosure.

For example, as shown in FIG. 12, the side-surface external electrode 16 of the multi-layer ceramic capacitor 10 may have a configuration of winding around the main surfaces 11e and 11f and the side surfaces 11c and 11d of the ceramic body 11. In this case, in the side-surface external electrode 16, a region formed on the side surface 11c of the ceramic body 11 is assumed as the first side-surface region 16a, and a region formed on the other side surface 11d of the ceramic body 11 is assumed as the second side-surface region 16b. Such a configuration can also provide actions and effects similar to those obtained in the embodiment described above.

6. Examples and Comparative Examples

As Examples and Comparative examples of this embodiment, samples of the multi-layer ceramic capacitor, in which the size of the ceramic body, the shift amount of the third external electrode, and the external electrode widths are changed, were produced, and the presence/absence of voids in the solder was confirmed.

First, ceramic bodies, in each of which a length dimension L in the X-axis direction is 1.0 mm, and a width dimension W in the Y-axis direction and a height dimension T in the Z-axis direction are 0.5 mm, were produced. External electrodes were formed on those ceramic bodies, in which the shift amount G is set to 15 μm and 100 μm, the end-surface electrode widths D1 and D2 are set to 70 μm to 270 μm, and the side-surface electrode width D3 is set to 250 to 450 thus producing the samples of the multi-layer ceramic capacitor. Those samples were assumed as Examples 1 to 18. Table 1 and Table 2 show specific end-surface electrode widths of Examples 1 to 18.

Further, samples, in each of which the side-surface external electrodes are formed without shift (shift amount G is 0) on the ceramic body having the above-mentioned dimensions, were produced and assumed as Comparative Example 1.

Further, samples, in each of which regions where the side-surface external electrodes face each other are completely displaced, were produced and assumed as Comparative Example 2. In this case, the side-surface electrode width D3 of the side-surface external electrode was set to 350 μm, and the shift amount G was set to 350 μm.

Similarly, ceramic bodies, in each of which a length dimension L in the X-axis direction is 1.2 mm, and a width dimension W in the Y-axis direction and a height dimension T in the Z-axis direction are 0.9 mm, were produced. External electrodes were formed on those ceramic bodies, in which the shift amount G is set to 15 μm, the end-surface electrode widths D1 and D2 are set to 70 μm to 270 μm, and the side-surface electrode width D3 is set to 250 to 450 μm, thus producing the samples of the multi-layer ceramic capacitor. Those samples were assumed as Examples 19 to 36. Table 1 and Table 2 show specific end-surface electrode widths of Examples 19 to 36.

Further, samples, in each of which the side-surface external electrodes are formed without shift (shift amount G is 0) on the ceramic body having the above-mentioned dimensions, were produced and assumed as Comparative Example 3.

Additionally, samples, in each of which regions where the side-surface external electrodes face each other are completely displaced, were produced and assumed as Comparative Example 4. In this case, the side-surface electrode width D3 of the side-surface external electrode was set to 350 μm, and the shift amount G was set to 350 μm.

Similarly, ceramic bodies, in each of which a length dimension L in the X-axis direction is 0.6 mm, and a width dimension W in the Y-axis direction and a height dimension T in the Z-axis direction are 0.3 mm, were produced. External electrodes were formed on those ceramic bodies, in which the shift amount G is set to 15 μm, the end-surface electrode widths D1 and D2 are set to 70 μm to 270 μm, and the side-surface electrode width D3 is set to 250 to 450 μm, thus producing the samples of the multi-layer ceramic capacitor. Those samples were assumed as Examples 37 to 54. Table 1 and Table 2 show specific end-surface electrode widths of Examples 37 to 54.

Further, samples, in each of which the side-surface external electrodes are formed without shift (shift amount G is 0) on the ceramic body having the above-mentioned dimensions, were produced and assumed as Comparative Example 5.

Additionally, samples, in each of which regions where the side-surface external electrodes face each other are completely displaced, were produced and assumed as Comparative Example 6. In this case, the side-surface electrode width D3 of the side-surface external electrode was set to 350 μm, and the shift amount G was set to 350 μm.

TABLE 1

| | | G/D3 | | |
|---|---|---|---|---|
| Length dimension 1.0 mm | Electrode width D3 | 350 μm | 250 μm | 450 μm |
| Width dimension 0.5 mm | | Examples 1, 4, 7 | Examples 2, 5, 8 | Examples 3, 6, 9 |
| Height dimension 0.5 mm | Shift amount G: 15 μm | 0.043 | 0.060 | 0.033 |
| | | Examples 10, 13, 16 | Examples 11, 14, 17 | Examples 12, 15, 18 |
| | Shift amount G: 100 μm | 0.286 | 0.400 | 0.222 |
| Length dimension 1.2 mm | Electrode width D3 | 350 μm | 250 μm | 450 μm |
| Width dimension 0.9 mm | | Examples 19, 22, 25 | Examples 20, 23, 26 | Examples 21, 24, 27 |
| Height dimension 0.9 mm | Shift amount G: 15 μm | 0.043 | 0.060 | 0.033 |
| | | Examples 28, 31, 34 | Examples 29, 32, 35 | Examples 30, 33, 36 |
| | Shift amount G: 100 μm | 0.286 | 0.400 | 0.222 |

TABLE 1-continued

| | | G/D3 | | |
|---|---|---|---|---|
| Length dimension 0.6 mm | Electrode width D3 | 250 μm | 150 μm | 350 μm |
| Width dimension 0.3 mm | | Examples 37, 40, 43 | Examples 38, 41, 44 | Examples 39, 42, 45 |
| Height dimension 0.3 mm | Shift amount G: 15 μm | 0.060 | 0.100 | 0.043 |
| | | Examples 46, 49, 52 | Examples 47, 50, 53 | Examples 48, 51, 54 |
| | Shift amount G: 50 μm | 0.200 | 0.333 | 0.143 |

TABLE 2

| | | (G*D3)/(D1 + D2) | | | | |
|---|---|---|---|---|---|---|
| Length dimension 1.0 mm | Electrode widths D1, D2 | 70 μm | 70 μm | 70 μm | Electrode widths D1, D2 | 150 μm |
| Width dimension 0.5 mm | Electrode width D3 | 350 μm | 250 μm | 450 μm | Electrode width D3 | 350 μm |
| Height dimension 0.5 mm | | Example 1 | Example 2 | Example 3 | | Example 4 |
| | Shift amount G: 15 μm | 37.50 | 26.79 | 48.21 | Shift amount G: 15 μm | 17.50 |
| | | Example 10 | Example 11 | Example 12 | | Example 13 |
| | Shift amount G: 100 μm | 250.00 | 178.57 | 321.43 | Shift amount G: 100 μm | 116.67 |
| Length dimension 1.2 mm | Electrode widths D1, D2 | 70 μm | 70 μm | 70 μm | Electrode widths D1, D2 | 150 μm |
| Width dimension 0.9 mm | Electrode width D3 | 350 μm | 250 μm | 450 μm | Electrode width D3 | 350 μm |
| Height dimension 0.9 mm | | Example 19 | Example 20 | Example 21 | | Example 22 |
| | Shift amount G: 15 μm | 37.50 | 26.79 | 48.21 | Shift amount G: 15 μm | 17.50 |
| | | Example 28 | Example 29 | Example 30 | | Example 31 |
| | Shift amount G: 100 μm | 250.00 | 178.57 | 321.43 | Shift amount G: 100 μm | 116.67 |
| Length dimension 0.6 mm | Electrode widths D1, D2 | 50 μm | 50 μm | 50 μm | Electrode widths D1, D2 | 100 μm |
| Width dimension 0.3 mm | Electrode width D3 | 200 μm | 100 μm | 150 μm | Electrode width D3 | 200 μm |
| Height dimension 0.3 mm | | Example 37 | Example 38 | Example 39 | | Example 40 |
| | Shift amount G: 15 μm | 30.00 | 15.00 | 22.50 | Shift amount G: 15 μm | 15.00 |
| | | Example 46 | Example 47 | Example 48 | | Example 49 |
| | Shift amount G: 50 μm | 100.00 | 50.00 | 150.00 | Shift amount G: 50 μm | 50.00 |
| Length dimension 1.0 mm | | 150 μm | 150 μm | Electrode widths D1, D2 | 270 μm | 270 μm | 270 μm |
| Width dimension 0.5 mm | | | | | | | |
| Height dimension 0.5 mm | | 250 μm | 450 μm | Electrode width D3 | 350 μm | 250 μm | 450 μm |
| | | Example 5 | Example 6 | | Example 7 | Example 8 | Example 9 |
| | | 12.50 | 22.50 | Shift amount G: 15 μm | 9.72 | 6.94 | 12.50 |
| | | Example 14 | Example 15 | | Example 16 | Example 17 | Example 18 |
| | | 83.33 | 150.00 | Shift amount G: 100 μm | 64.81 | 46.30 | 83.33 |
| Length dimension 1.2 mm | | 150 μm | 150 μm | Electrode widths D1, D2 | 270 μm | 270 μm | 270 μm |
| Width dimension 0.9 mm | | | | | | | |
| Height dimension 0.9 mm | | 250 μm | 450 μm | Electrode width D3 | 350 μm | 250 μm | 450 μm |
| | | Example 23 | Example 24 | | Example 25 | Example 26 | Example 27 |
| | | 12.50 | 22.50 | Shift amount G: 15 μm | 9.72 | 6.94 | 12.50 |
| | | Example 32 | Example 33 | | Example 34 | Example 35 | Example 36 |
| | | 83.33 | 150.00 | Shift amount G: 100 μm | 64.81 | 46.30 | 83.33 |
| Length dimension 0.6 mm | | 100 μm | 100 μm | Electrode widths D1, D2 | 150 μm | 150 μm | 150 μm |
| Width dimension 0.3 mm | | | | | | | |
| Height dimension 0.3 mm | | 100 μm | 150 μm | Electrode width D3 | 200 μm | 100 μm | 150 μm |
| | | Example 41 | Example 42 | | Example 43 | Example 44 | Example 45 |
| | | 7.50 | 11.25 | Shift amount G: 15 μm | 10.00 | 5.00 | 7.50 |
| | | Example 50 | Example 51 | | Example 52 | Example 53 | Example 54 |
| | | 25.00 | 75.00 | Shift amount G: 50 μm | 33.33 | 16.67 | 50.00 |

For each of Examples 1 to 54, a value of G/D3 and a value of (G*D3)/(D1+D2) were calculated from the values of the electrode widths D1, D2, and D3 and the shift amount G. Table 1 shows the results of G/D3, and Table 2 shows the results of (G*D3)/(D1+D2). Examples 1 to 27 each satisfied the relationship of 0.03≤G/D3≤0.50, and the relationship of 5.0≤(G*D3)/(D1+D2)≤400.

Subsequently, each sample of the multi-layer ceramic capacitor was soldered on the lands of the circuit board by a reflow method, and the presence/absence of voids in the solder was confirmed.

Specifically, in the circuit board obtained after soldering, the solders provided between the multi-layer ceramic capacitor and the board body was observed on a cross section parallel to the mount surface. The observation was performed on 100 samples for each of Examples and Comparative Examples by using an optical microscope in a scale factor of 800 to 1,500 times. Further, in the case where voids of 2.5 μm or more were observed, the presence of voids was determined.

As a result, voids in the solder were not observed in any of Examples 1 to 54.

Meanwhile, in Comparative Examples 1, 3, and 5, in which the side-surface external electrodes are not shifted, voids in the solder were observed. Further, in Comparative Examples 2, 4, and 6, in which the side-surface external electrodes are completely displaced, voids in the solder were not observed, but the multi-layer ceramic capacitor was obliquely mounted to the lands and not mounted at the design position.

From those results, it was confirmed that the multi-layer ceramic capacitors and the circuit boards according to Examples 1 to 54 include no voids in the solder and are each mounted at a position close to the design position, and high connection reliability can be achieved.

Hereinabove, the embodiments of the present disclosure have been described, but the present disclosure is not limited to the embodiments described above, and it should be appreciated that the present disclosure may be variously modified without departing from the gist of the present disclosure.

What is claimed is:

1. A multi-layer ceramic capacitor, comprising:
    a ceramic body including
        a first end surface and a second end surface that face each other in a first direction,
        a first side surface and a second side surface that face each other in a second direction orthogonal to the first direction,
        first internal electrodes drawn to the first end surface and the second end surface,
        second internal electrodes drawn to at least one of the first side surface and the second side surface, and
        dielectric layers,
        the first internal electrodes and the second internal electrodes being alternately laminated via the dielectric layers;
    a first external electrode that covers the first end surface, extends to each of the first side surface and the second side surface, and is connected to the first internal electrodes;
    a second external electrode that covers the second end surface, extends to each of the first side surface and the second side surface, and is connected to the first internal electrodes; and
    a third external electrode that includes a first side-surface region formed on the first side surface and a second side-surface region formed on the second side surface, and is connected to the second internal electrodes,
    the first side-surface region and the second side-surface region being formed to be mutually shifted along the first direction and at least partially facing each other in the second direction.

2. The multi-layer ceramic capacitor according to claim 1, wherein
    a relationship of 0.03≤G/D3≤0.50 is satisfied,
    where D3 represents a dimension of the third external electrode along the first direction, and G represents a shift amount in the first direction between a center line of the first side-surface region in the first direction and a center line of the second side-surface region in the first direction.

3. The multi-layer ceramic capacitor according to claim 2, wherein
    a relationship of 0.04≤G/D3≤0.40 is satisfied.

4. The multi-layer ceramic capacitor according to claim 3, wherein
    a relationship of 0.06≤G/D3≤0.40 is satisfied.

5. The multi-layer ceramic capacitor according to claim 1, wherein
    a relationship of 5.0≤(G*D3)/(D1+D2)≤400 is satisfied,
    where D1 represents a dimension of the first external electrode in the first direction, D2 represents a dimension of the second external electrode in the first direction, D3 represents a dimension of the third external electrode along the first direction, and G represents a shift amount in the first direction between a center line of the first side-surface region in the first direction and a center line of the second side-surface region in the first direction.

6. The multi-layer ceramic capacitor according to claim 5, wherein
    a relationship of 10.0≤(G*D3)/(D1+D2)≤250 is satisfied.

7. The multi-layer ceramic capacitor according to claim 6, wherein
    a relationship of 20.0≤(G*D3)/(D1+D2)≤100 is satisfied.

8. The multi-layer ceramic capacitor according to claim 1, wherein
    the ceramic body has a dimension of 0.2 mm or more and 1.0 mm or less in the second direction.

9. The multi-layer ceramic capacitor according to claim 1, wherein
    the multi-layer ceramic capacitor has an electrostatic capacitance of 23 μF or more and less than 30 μF.

10. The multi-layer ceramic capacitor according to claim 1, wherein
    the multi-layer ceramic capacitor has an electrostatic capacitance of 30 μF or more and 47 μF or less.

11. A circuit board, comprising:
    a multi-layer ceramic capacitor including
        a ceramic body, and
        a first external electrode, a second external electrode, and a third external electrode that are formed on the ceramic body; and
    a mounting board including
        a first connection electrode connected to the first external electrode via a first solder,
        a second connection electrode connected to the second external electrode via a second solder, and
        a third connection electrode connected to the third external electrode via a third solder,
    the ceramic body including
        a first end surface and a second end surface that face each other in a first direction, a first side surface and a second side surface that face each other in a second direction orthogonal to the first direction, first internal electrodes drawn to the first end surface and the second end surface, second internal electrodes drawn to at least one of the first side surface and the second side surface, and dielectric layers, the first internal electrodes and the second internal electrodes being alternately laminated via the dielectric layers, the first external electrode covering the first end surface, extending to each of the first side surface and the second side surface, and being connected to the first internal electrodes, the second external electrode covering the second end surface, extending to each of the first side surface and the second side surface, and being connected to the first internal electrodes, the third external electrode including a first side-surface region formed on the first side surface and a second side-surface region formed on the second side surface, and being connected to the second internal electrodes, the first side-surface region and the second side-surface region being formed to be mutually shifted along the first direction and at least partially facing each other in the second direction.

\* \* \* \* \*